US009243553B2

(12) United States Patent
Kokotovic et al.

(10) Patent No.: US 9,243,553 B2
(45) Date of Patent: Jan. 26, 2016

(54) ELECTRIC WASTE GATE CONTROL SYSTEM SENSOR CALIBRATION WITH END-STOP DETECTION

(71) Applicant: Ford Global Technologies, LLC, Dearborn, MI (US)

(72) Inventors: Vladimir V. Kokotovic, Bloomfield Hills, MI (US); Yan Wang, Ann Arbor, MI (US)

(73) Assignee: Ford Global Technologies, LLC, Deaborn, MI (US)

(*) Notice: Subject to any disclaimer, the term of this patent is extended or adjusted under 35 U.S.C. 154(b) by 345 days.

(21) Appl. No.: 13/896,257

(22) Filed: May 16, 2013

(65) Prior Publication Data

US 2014/0338307 A1    Nov. 20, 2014

(51) Int. Cl.
| | | |
|---|---|---|
| *G01M 15/02* | (2006.01) | |
| *F02B 37/22* | (2006.01) | |
| *F02B 37/18* | (2006.01) | |
| F02B 29/04 | (2006.01) | |
| F02M 25/07 | (2006.01) | |
| F02B 37/12 | (2006.01) | |
| F02B 37/16 | (2006.01) | |
| F02D 41/08 | (2006.01) | |
| F02D 41/12 | (2006.01) | |
| F02D 41/24 | (2006.01) | |
| F02D 41/00 | (2006.01) | |

(52) U.S. Cl.
CPC .............. *F02B 37/22* (2013.01); *F02B 37/186* (2013.01); *F02D 41/2474* (2013.01); *F01N 2560/025* (2013.01); *F01N 2560/06* (2013.01); *F02B 29/04* (2013.01); *F02B 37/127* (2013.01); *F02B 37/16* (2013.01); *F02D 41/0007* (2013.01); *F02D 41/08* (2013.01); *F02D 41/123* (2013.01); *F02D 41/2441* (2013.01); *F02M 25/0707* (2013.01); *Y02T 10/144* (2013.01)

(58) Field of Classification Search
CPC ...................................................... G01M 15/02
USPC ................ 73/112.01, 112.03, 114.69, 114.77
See application file for complete search history.

(56) References Cited

U.S. PATENT DOCUMENTS

| | | | |
|---|---|---|---|
| 4,378,677 | A | 4/1983 | Zumstein |
| 4,459,809 | A | 7/1984 | Tadokoro et al. |
| 4,656,834 | A | 4/1987 | Elpern |
| 5,729,980 | A | 3/1998 | Mackay |
| 5,816,047 | A | 10/1998 | Zurlo |

(Continued)

FOREIGN PATENT DOCUMENTS

WO    2008025754 A1    3/2008

OTHER PUBLICATIONS

Kokotovic, Vladimir K et al., "Method and System for Operating an Engine Turbocharger Waste Gate," U.S. Appl. No. 13/896,260, filed May 16, 2013, 31 pages.

(Continued)

*Primary Examiner* — Eric S McCall
(74) *Attorney, Agent, or Firm* — Julia Voutyras; Alleman Hall McCoy Russell & Tuttle LLP

(57) ABSTRACT

Various embodiments relating to detection of an end-stop position of a waste gate valve and calibration of a waste gate position sensor relative to the detected end-stop position are provided. In this way, it is possible to more accurately control the waste gate.

18 Claims, 4 Drawing Sheets

(56) References Cited

U.S. PATENT DOCUMENTS

| | | | |
|---|---|---|---|
| 8,001,782 | B2 | 8/2011 | Pursifull |
| 8,109,089 | B2 | 2/2012 | Gilch et al. |
| 8,117,841 | B2 | 2/2012 | Eckart |
| 8,347,625 | B2 | 1/2013 | Baeuerle |
| 2009/0048802 | A1 | 2/2009 | Wang et al. |
| 2011/0023481 | A1 | 2/2011 | Baeuerle |
| 2012/0171059 | A1 | 7/2012 | Love et al. |
| 2014/0174073 | A1* | 6/2014 | Karnik et al. ............ 60/602 |
| 2014/0174074 | A1* | 6/2014 | Hilditch et al. ............ 60/602 |
| 2014/0328665 | A1* | 11/2014 | Glugla et al. ............ 415/1 |
| 2014/0360178 | A1* | 12/2014 | Wang ............ 60/602 |
| 2015/0059338 | A1* | 3/2015 | Wang et al. ............ 60/602 |
| 2015/0082788 | A1* | 3/2015 | Wang et al. ............ 60/602 |

OTHER PUBLICATIONS

Wang, Yan, "Method for Determining Wastegate Valve Lift," U.S. Appl. No. 13/914,386, filed Jun. 10, 2013, 28 pages.

Karnik, Amey Y. et al., "Method for Controlling a Turbocharger Arrangement with an Electric Actuator and Spring," U.S. Appl. No. 13/654,309, filed Oct. 17, 2012, 32 pages.

\* cited by examiner

ELECTRIC WASTE GATE CONTROL SYSTEM SENSOR CALIBRATION WITH END-STOP DETECTION

BACKGROUND AND SUMMARY

Engine boost may be controlled by adjusting an amount of gas flowing through a turbine of a turbocharger, for example via a waste gate. In one example, a waste gate may include a waste gate valve and a valve seat. The waste gate valve may be actuated by an associated electric actuator. The electric actuator may be controlled to adjust a waste gate valve position, thereby controlling the amount of gas flowing through the turbine and achieving the desired boost. Electric waste gate actuation may provide a faster response and more precise position control relative to a pneumatically-actuated waste gate. The faster response and more precise control may increase engine efficiency, fuel efficiency and emissions control.

In one example, an electric actuator that is used to control the position of a waste gate valve includes an electric motor which transmits a force to a plurality of linkages that are coupled to the waste gate valve. The plurality of linkages directly actuates the waste gate valve to adjust the waste gate valve position. The plurality of linkages allows the electric motor to be positioned remotely from an exhaust passage where the waste gate is located so as to reduce the likelihood of degradation of the electric motor due to heat exposure. The electric motor is controlled based on feedback from a position sensor that is coupled to a gear box output shaft and provides an indication of a waste gate valve position.

However, the inventors herein have identified some potential issues with such an approach. For example, although the gear box output shaft sensor provides gear box output shaft position detection, and the waste gate valve is adjusted based on information of the gear box output shaft position, the sensor provides no indication of an end-stop of the waste gate. In particular, an end-stop of the waste gate may include a position where the waste gate valve suitably aligns with the valve seat to substantially prevent gas from flowing through the waste gate. On the other hand, the end-stop may include a position where the waste gate valve is fully open.

In the above described approach, the gear box output shaft sensor does not provide an indication of the waste gate valve position relative to a valve seat position. Without knowing the end-stop of the waste gate valve, when the waste gate valve is commanded to a closed position the waste gate valve position may be adjusted too much causing the waste gate valve to impact the valve seat at a high velocity. By adjusting the waste gate valve too much, noise, vibration, harshness (NVH) conditions and wear on the valve seat may be increased. In addition, the closed-loop control system may apply too much current to the waste gate trying to move the waste gate valve to a desired stop position that is physically impossible to reach, leading to high stress in the whole system. On the other hand, the waste gate valve position may be adjusted too little causing the waste gate valve to not properly seal with the valve seat resulting in undesired flow of gas through the waste gate that reduces boost pressure.

Furthermore, the waste gate valve and the plurality of linkages may be exposed to high temperatures within the turbine that can affect accuracy of the position sensor output. For example, the plurality of linkages changes length as temperature changes. Under some conditions, such changes in length may cause the end-stop position of the waste gate valve to be reached before that position is indicated by the gear box output shaft sensor.

Thus in one example, some of the above issues may be at least partly addressed by a method, comprising: during calibration of a waste gate position sensor: adjusting a waste gate valve to a first end-stop position, associating a first feedback position with the first end-stop position, adjusting the waste gate valve to a second end-stop position, associating a second feedback position with the second end-stop position, and adjusting a position sensor gain based on the first feedback position and the second feedback position.

By detecting an end-stop (valve seat) position of the waste gate valve and providing feedback control of the waste gate valve relative to the end-stop position, control accuracy with respect to aligning the waste gate valve with a valve seat to close the waste gate may be increased. In this way, high impact between the waste gate valve and the valve seat will be reduced and NVH conditions may be reduced. Moreover, the end stop detection and corresponding position sensor calibration may increase waste gate lift control accuracy, which in turn may increase boost control accuracy.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Various systems and methods are provided for detecting an end-stop position of a waste gate valve in a turbine of a turbocharger. The end-stop position of the waste gate valve may include a position where the waste gate valve suitably aligns with a valve seat to substantially prevent gas from flowing through the waste gate (e.g., less than 5% of total flow). On the other hand, the end-stop position may include a position where the waste gate valve is fully open.

In one example, an end-stop detection routine includes commanding a complete stroke of the waste gate valve from a completely open position to a completely closed position. When the waste gate valve is commanded to an end-stop position, a plurality of conditions may be checked to determine whether the waste gate valve is indeed positioned at an end-stop position. For example, the plurality of conditions may include a difference between a feedback position signal of the waste gate valve and a commanded position signal of the waste gate valve being greater than a predetermined threshold value in a steady state condition; a velocity of the electric motor being less than a threshold velocity (e.g., substantially zero); and the feedback position signal value of the waste gate valve being between an upper threshold that indicates that an end-stop position is reached and a lower threshold that indicates a commanded signal to close the waste gate valve. If all these conditions are met, then the waste gate valve may be declared to be at an end-stop position. The waste gate valve position sensor readings during this time provide a corresponding voltage that may be associated with the particular end-stop position if the conditions are met.

End-stop detection may be utilized in a waste gate valve position sensor calibration strategy. The waste gate valve position sensor calibration strategy may be performed throughout engine operation to adapt to physical changes of the waste gate actuator as operating conditions change. In particular, because the waste gate actuator may be exposed to high temperatures within the turbocharger, a plurality of linkages connecting the waste gate valve to the electric motor may change length, and such changes in length may affect the accuracy of the position sensor. As such, the position sensor calibration strategy may be performed throughout operation to maintain accuracy of the waste gate valve position sensor output.

Furthermore, since end-stop detection requires the waste gate valve to be adjusted a full stroke between a closed position and an open position, such end-stop detection may be intrusive to operation, under some conditions. Accordingly, the end-stop detection routine may be performed during particular operating conditions where the full stroke of the waste gate valve may have little or no effect on engine operation.

Figure 1:
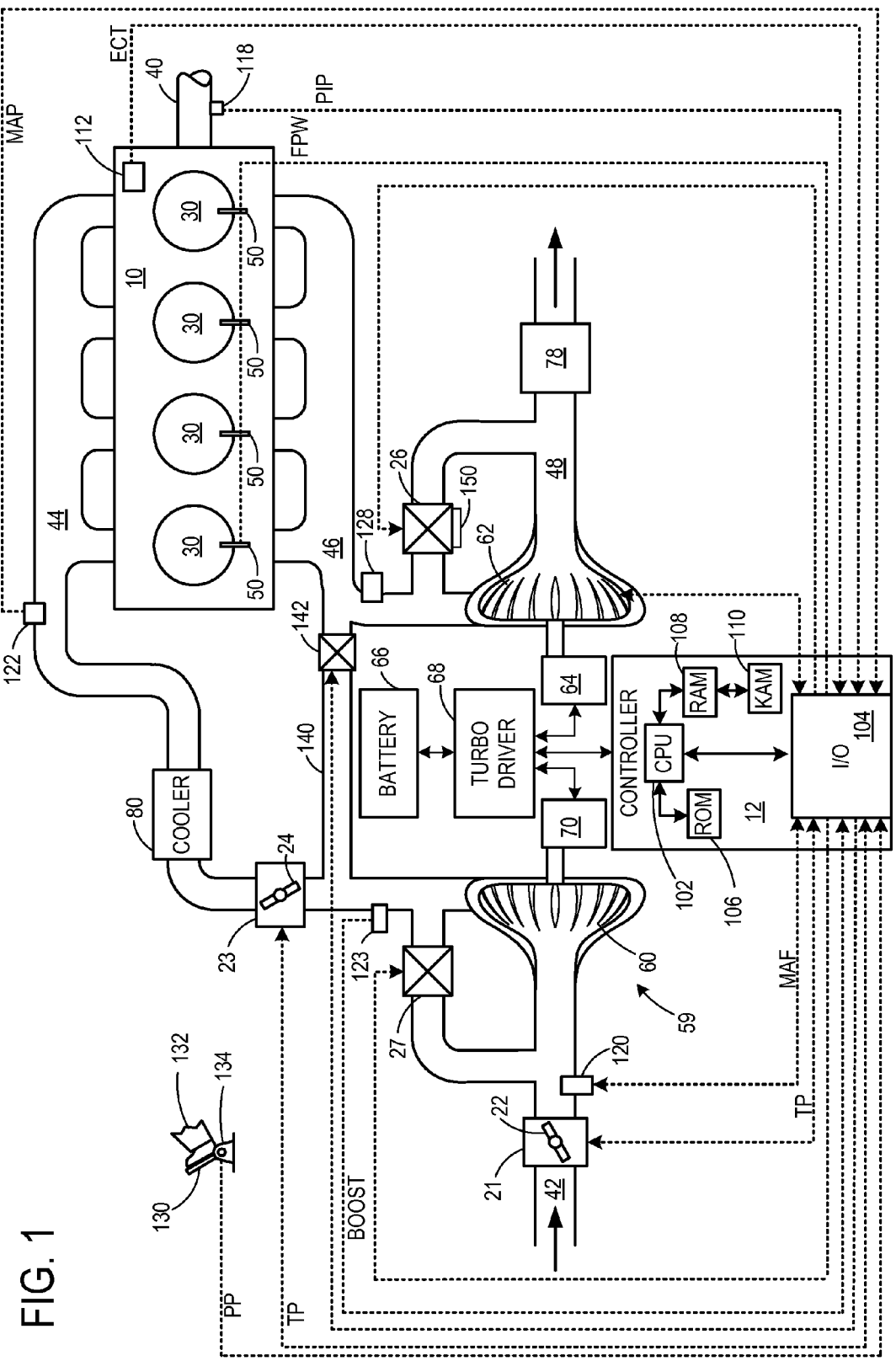
FIG. 1 shows an engine system including a turbocharger according to an embodiment of the present disclosure.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves. In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12. In some embodiments, one or more of the throttles may be omitted.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

In some embodiments, sensor 128 may include an exhaust temperature sensor configured to measure exhaust temperature in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium (or storage machine, storage device, etc.) for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a turbocharger 59 including at least a compressor 60 arranged along intake manifold 44. Compressor 60 may be at least partially driven by a turbine 62, via, for example a shaft, or other coupling arrangement. The turbine 62 may be arranged along exhaust passage 48. Various arrangements may be provided to drive the compressor. The amount of compression provided to one or more cylinders of the engine via the turbocharger 59 may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12 that is indicative of a turbocharger pressure level.

Further, exhaust passage 48 may include waste gate 26 for diverting exhaust gas away from turbine 62. In some embodiments, waste gate 26 may be a multi-staged waste gate, such as a two-staged waste gate with a first stage configured to control boost pressure and a second stage configured to increase heat flux to emission control device 78. Waste gate 26 may be operated with an actuator 150, which, for example, may be an electric actuator. In some embodiments, actuator 150 may be an electric motor that may be controlled by controller 12 to adjust a position of a waste gate valve. Additional details regarding waste gate 26 and actuator 150 will be discussed in further detail below with reference to FIG. 2.

Intake passage 42 may include a compressor bypass valve 27 configured to divert intake air around compressor 60. Waste gate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Figure 2:
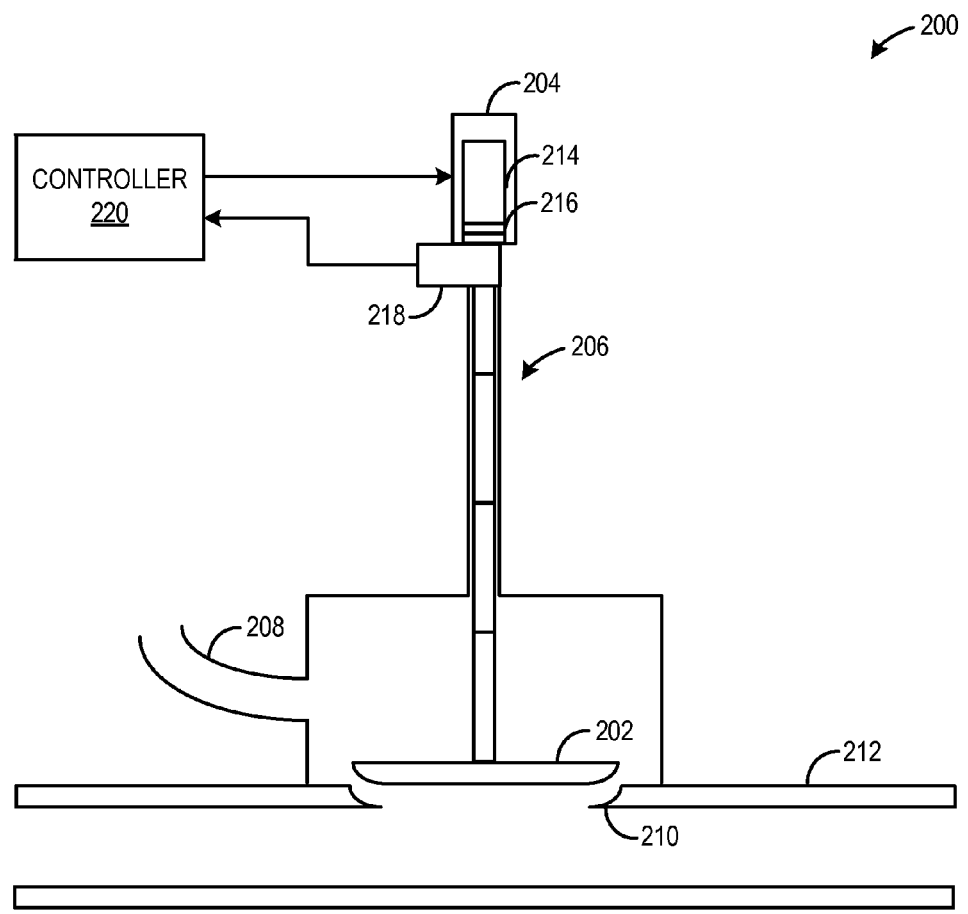
FIG. 2 shows an electrically-actuated waste gate that may be implemented in a turbocharger according to an embodiment of the present disclosure.

FIG. 2 shows an electrically-actuated waste gate 200 that may be implemented in a turbocharger according to an embodiment of the present disclosure. For example, waste gate 200 may be implemented as waste gate 26 shown in FIG. 1. Waste gate 200 may include a waste gate valve 202 that may be actuated by a waste gate actuator 204 via a plurality of linkages 206. In the illustrated embodiment, waste gate 200 is an electric waste gate and waste gate actuator 204 includes an electric motor 214. Electric motor 214 transmits a driving force to waste gate valve 202 via the plurality of linkages 206 to transition the waste gate valve between a fully closed position and a fully open position (e.g., end-stop positions), and any position therebetween. When in the fully closed position, waste gate valve 202 may align with a valve seat 210 to substantially prevent exhaust gas from flowing through the waste gate 200. On the other hand, waste gate 200 includes a vent 208 which may receive and exhaust gas from exhaust manifold 212 when waste gate valve 202 is not in the fully closed position, such that the waste gate valve is aligned with the valve seat. Thus, the amount of boost supplied to an engine may be controlled at least in part by driving waste gate valve 202 via electric actuator 214, thereby altering the position of waste gate valve 202 and the amount of gas reaching an intake manifold.

Waste gate actuator 204 may include the electric motor 214 and an output gear 216 that transmits power from the electric motor 214 to the plurality of linkages 206. The plurality of linkages 206 may allow the waste gate actuator 204 to be located remotely from the waste gate valve 202 and the exhaust manifold 212 so that the waste gate actuator may be exposed to less heat than the waste gate valve. The plurality of linkages may transmit power output from the electric motor in any suitable manner to adjust a position of the waste gate valve. By positioning the waste gate actuator away from the exhaust manifold a likelihood of degradation due to heat exposure may be reduced.

In some embodiments, waste gate 200 further includes a bias. The bias may be selected to supply a closing force which maintains waste gate valve 202 in a fully closed position up to a threshold pressure. The current supplied to a waste gate actuator may be selected to account for the closing force of a bias, such as a spring. It will be appreciated that various suitable structures may be used to supply bias or additional closing force to waste gate valve 202. In the case where a spring is employed, the spring constant may be selected to supply closing force up to a particular threshold pressure and supply sufficient boost to an engine.

A waste gate position sensor 218 may be coupled to waste gate actuator 204 to provide an indication of a position of waste gate valve 202. For example, position sensor 218 may measure a rotation angle of output gear 216 of electric motor 214 that corresponds to a position of waste gate valve 202. In particular, electric motor 214 may have a rotational range of motion that corresponds to an operating range of waste gate valve 202. Position sensor 218 may provide an indication of a waste gate valve position to a controller 220.

Controller 220 may be configured to control operation of electric motor 214 to adjust a position of waste gate valve 202 thereby controlling a level of boost provided by a turbocharger of an engine. In one example, controller 220 corresponds to controller 12 shown in FIG. 1. More particularly, controller 220 may be configured to adjust a position of waste gate valve 202 based on feedback from position sensor 218 relative to a determined end-stop position of the waste gate valve.

In one example, controller 220 may be configured to perform an end-stop detection routine to determine end-stop positions of waste gate valve 202. In particular, controller 220 may be configured to command a complete stroke of waste gate valve 202 from a completely open position to a completely closed position via control of electric motor 214 in order to determine a corresponding end-stop position at each end of the stroke. When waste gate valve 202 is commanded to an end of the stroke, the following conditions are checked: it is determined whether a difference between a feedback position signal of the waste gate valve and a commanded position signal is above a predetermined threshold while the signals are in a steady state condition (e.g., the signals indicate the waste gate valve is at an end of the stroke); it is determined that a velocity of waste gate actuator 204 is below a predetermined threshold (e.g., substantially zero); and a current signal corresponding to the commanded position is between two predetermined threshold levels. For example, an upper level may indicate that an end-stop position is reached, among other conditions. The lower level may indicate a minimum level at which the waste gate 200 is completely closed such that the waste gate valve 202 is aligned with the compliant structure of valve seat 210. If all these conditions are met, then the waste gate valve is declared to be at an end-stop position, and the controller 220 may set the position sensor voltage readings during the end-stop detection interval as a voltage corresponding to the particular end-stop position.

In some embodiments, during the end-stop detection interval, the position sensor signal readings (except the commanded position signal) may be filtered such that a mean value is obtained based on an integral over interval calculation for the predetermined time interval that may provide a voltage for the particular end-stop position.

The controller 220 may be configured to repeat the position sensor calibration sequence throughout operation to maintain control accuracy of the waste gate valve as operating conditions change. For example, calibration may be performed often, because the waste gate may be exposed to high temperatures within the turbocharger that can affect the accuracy of the position sensor output. In addition, the waste gate electric motor may generate heat that affects the accuracy of the position sensor.

In some embodiments, the controller 220 may be configured to perform the position sensor calibration routine at a designated time interval. In some embodiments, the controller 220 may be configured to perform the position sensor calibration routine during conditions where commanding a full stroke of the waste gate valve does not interfere with operation of the turbocharger. In particular, since the position sensor calibration routine may be intrusive to operation of the turbocharger, it may be desirable to performed the routine during conditions where interfering with operation of the turbocharger may not degrade drivability of the vehicle. For example, the controller 220 may be configured to perform the waste gate position sensor calibration routine during engine idle conditions. More particularly, the calibration routine may be performed during engine idle conditions when there is no indication of vehicle operator input of vehicle acceleration that would increase a turbocharger pressure level. In one example, the calibration routine may be performed during idle conditions at engine startup.

In another example, the calibration routine may be performed during deceleration fuel shut off (DFSO) conditions. For example, DFSO conditions may occur during vehicle coasting when fuel injection is shut-off, the throttle is closed, and the engine is running faster than idle speed. DFSO conditions may occur a different engine speeds. The calibration routine may be performed during DFSO conditions because there is not an imminent use for turbocharger pressure, because the vehicle is decelerating. Accordingly, opening the waste gate to perform the calibration routine may not interfere with drivability of the vehicle during DFSO conditions.

It will be appreciated that the controller 220 may be configured to detect any suitable condition that does not interfere with vehicle drivability to perform the calibration routine without departing from the scope of the present disclosure.

It will be appreciated that various suitable waste gate arrangements may be used without departing from scope of the present disclosure, and may, for example, depend on mechanical design and packaging constraints.

The configurations illustrated above enable various methods for detecting end-stop positions of a waste gate valve, and calibrating a position sensor based on the detected end-stop positions. Accordingly, some such methods are now described, by way of example, with continued reference to above configurations. It will be understood, however, that these methods, and others fully within the scope of the present disclosure, may be enabled via other configurations as well.

Figure 3:
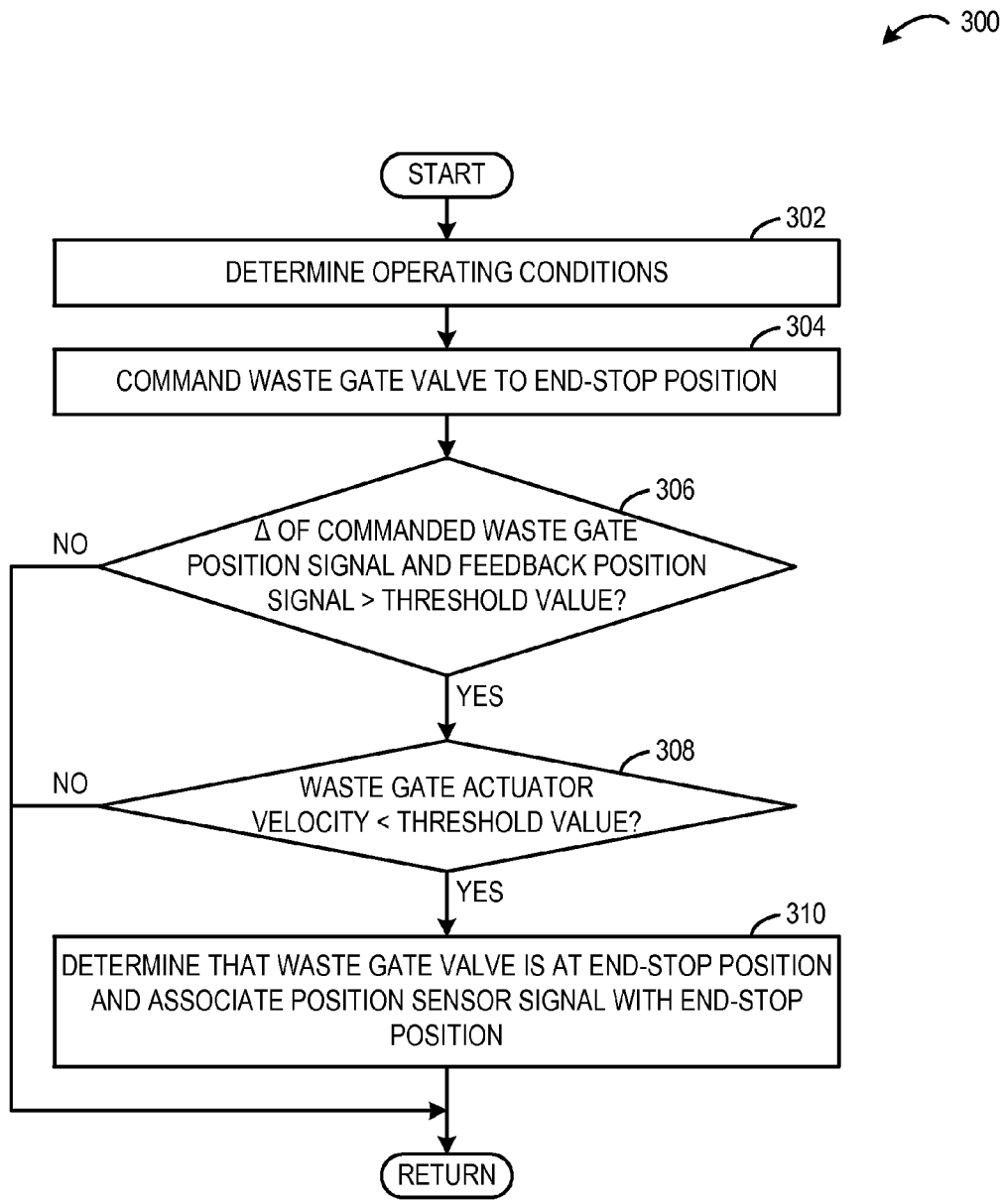
FIG. 3 shows a method for detecting an end-stop (valve seat) position of an electrically actuated waste gate according to an embodiment of the present disclosure.

FIG. 3 shows a method 300 for detecting an end-stop position of an electrically actuated waste gate valve according to an embodiment of the present disclosure. For example, the method may be performed by controller 12 of FIG. 1 or controller 220 of FIG. 2. At 302, the method 300 may include determining operating conditions. For example, determining operating conditions may include receiving sensor signals that are indicative of operating parameters of the vehicle and calculating or inferring various operating parameters. Further, determining operating conditions may include determining the state of components and actuators of the vehicle. In one example, operating parameters that may be determined include engine speed, turbocharger pressure, waste gate valve position (e.g., voltage), waste gate actuator velocity, etc.

At 304, the method 300 may include commanding a waste gate valve to an end-stop position. For example, the command may be performed by controlling an electric motor coupled to the waste gate valve. In one particular example, commanding includes commanding a complete stroke of the waste gate valve from a completely open position to a completely closed position.

At 306, the method 300 may include determining whether a difference between a command signal of the waste gate valve and a feedback position signal is greater than a predetermined threshold value while the signals are in a steady state condition. For example, the feedback position signal may be provided by a position sensor, such as sensor 218 shown in FIG. 2. The determination may be performed to verify that the waste gate valve did indeed move to the commanded position. If the difference between the command signal and the feedback position signal is greater than the predetermined threshold value while the signals are in a steady state condition, then the method 300 moves to 308. Otherwise, the method 300 returns to other operations.

At 308, the method 300 may include determining whether a waste gate actuator velocity is less than a threshold velocity value. For example, the threshold velocity value may be substantially zero or just greater than zero. In one example, the determined velocity may be of electric motor 214 shown in FIG. 2. The determination may be performed to verify if the waste gate valve is in a steady state position. If the waste gate actuator velocity is less than the threshold velocity value, then the method 300 moves to 310. Otherwise, the method 300 returns to other operations.

At 310, if all these conditions are met, then the waste gate valve is determined to be at the end-stop position and the position sensor feedback signal is associated with the end-stop position. In some embodiments, during the time at the end-stop position, all the feedback signals may be filtered such that a mean value is obtained based on integral over interval calculation for the testing period or predetermined time interval. The mean value of the sensor readings during this time provides a sensor signal level (e.g., voltage) that is associated with this particular end-stop position.

Once the end-stop position is determined, the method may be repeated to determine the other end-stop position. In particular, the waste gate valve may be commanded to the other end-stop position, and the sequences may be repeated and after the waste gate valve is declared to be at the other end-stop position, the position sensor's reading may be associated with a new position sensor signal for the other end-stop position. This end-stop detection routine may be performed at predetermined time intervals. Time spent at each end-stop position (e.g., top and bottom) may be adjustable.

The above method may be performed to determine an end-stop position of a waste gate valve. The determined end-stop position may be used in position sensor calibration strategy described herein.

Figure 4:
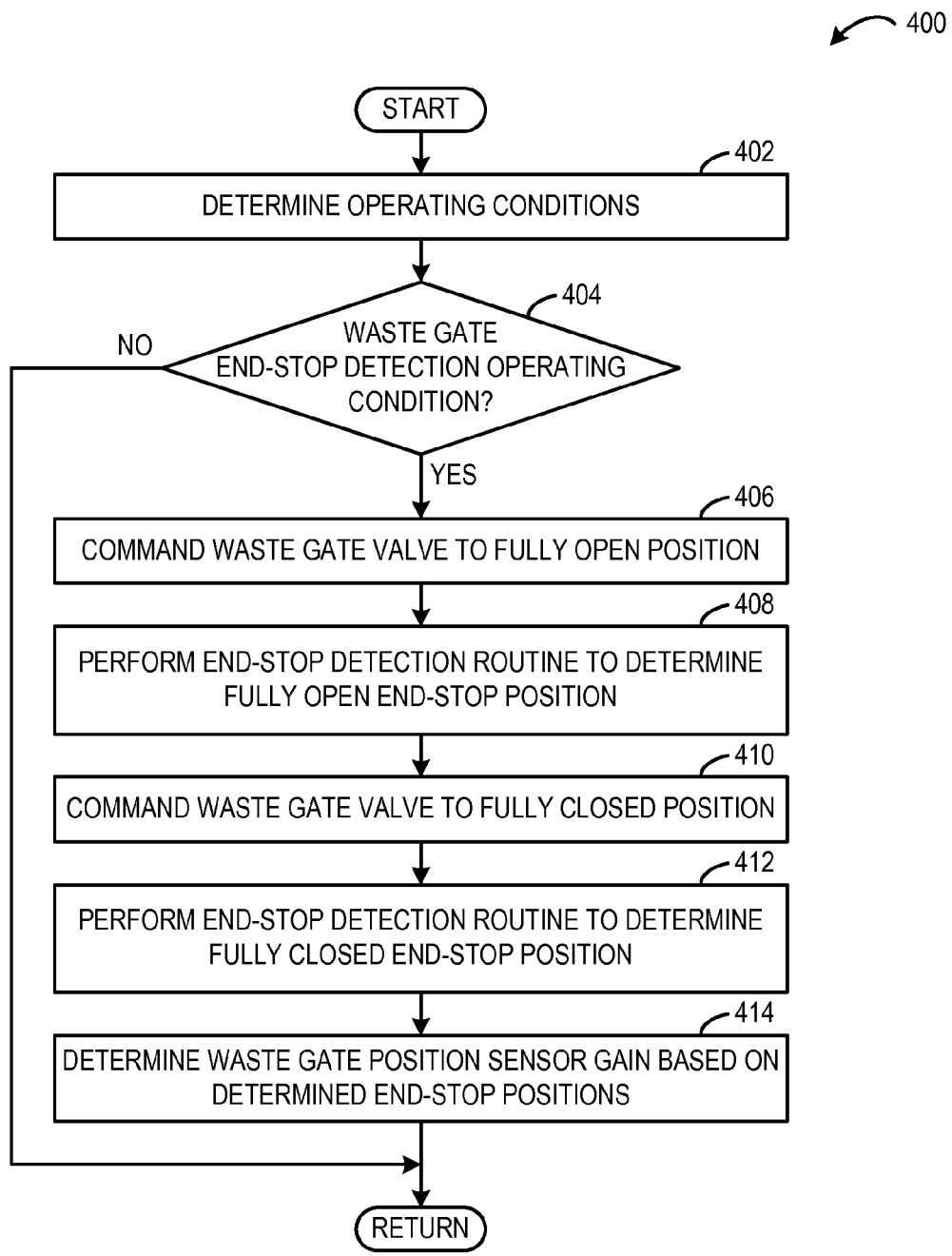
FIG. 4 shows a method for calibrating a position sensor based on detected (valve seat) positions of a waste gate valve according to an embodiment of the present disclosure.

FIG. 4 shows a method 400 for calibrating a position sensor based on detected end-stop positions of a waste gate valve according to an embodiment of the present disclosure. For example, the method may be performed by controller 12 of FIG. 1 or controller 220 of FIG. 2. At 402, the method 400 may include determining operating conditions.

At 404, the method 400 may include determining whether operating conditions are suitable for performing end-stop detection and position sensor calibration. As discussed above, the end-stop detection routine may be an intrusive operation under some conditions, because a full stroke of the waste gate valve is commanded in order to determine the end-stop positions at each end of the stroke. Accordingly, it may be determined whether operating conditions are suitable to command the full stroke of the waste gate valve without interfering or minimally interfering with drivability of the vehicle.

For example, suitable operating conditions include engine idle conditions. More particularly, the calibration routine may be performed during engine idle conditions when there is no indication of vehicle acceleration from vehicle operator input that would increase a turbocharger pressure level. In one example, the calibration routine may be performed during idle conditions at engine startup. In another example, the calibration routine may be performed during conditions where the waste gate is opened to reduce a turbocharger pressure level. In another example, the calibration routine may be performed during deceleration fuel shut off (DFSO) conditions. It will be appreciated that any suitable condition that does not interfere with vehicle drivability may be determined to perform the calibration routine without departing from the scope of the present disclosure. If it is determined that operating conditions are suitable for performing position sensor calibration, then the method 400 moves to 406. Otherwise, the method 400 returns to other operations.

At 406, the method 400 may include commanding the waste gate valve to a fully open position.

At 408, the method 400 may include performing an end-stop detection routine to determine a fully open end-stop position of the waste gate valve. The end-stop position may be associated with a position sensor signal voltage as a result of performing the end-stop detection routine. For example, the end-stop detection routine that may be performed may include the method 300 shown in FIG. 3.

At 410, the method 400 may include commanding the waste gate valve to a fully closed position. In other words, a full stroke of the waste gate valve may be performed.

At 412, the method 400 may include performing an end-stop detection routine to determine a fully closed end-stop position of the waste gate valve. The end-stop position may be associated with a position sensor signal voltage as a result of performing the end-stop detection routine. For example, the end-stop detection routine that may be performed may include the method 300 shown in FIG. 3. It will be appreciated that that order in which the end-stop positions are detected may be switched without departing from the scope of the present disclosure.

At 414, the method 400 may include determining a waste gate position sensor gain based on the determined end-stop positions. In particular, both of the end-stop position sensor voltage readings may be used to calculate a new sensor gain for adjusting the waste gate valve between the end-stop positions.

In some embodiments, the sensor calibration sequence may be repeated at predetermined time intervals to maintain calibration of the waste gate position sensor. In some embodiments, the sensor calibration sequence may be repeated when operating temperature changes enough to affect the physical characteristics of the components of the waste gate. Accordingly, accurate control of the waste gate may be maintained throughout operation of the vehicle even as components of the waste gate undergo physical changes due to changes in operating conditions (e.g., expansion of linkages due to heat exposure).

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method, comprising:
    during calibration of a waste gate position sensor:
        adjusting a waste gate valve to a first end-stop position;
        associating a first feedback position with the first end-stop position;
        adjusting the waste gate valve to a second end-stop position;
        associating a second feedback position with the second end-stop position; and
        adjusting a position sensor gain based on the first feedback position and the second feedback position;
        wherein the first feedback position is associated with the first end-stop position responsive to a difference between a feedback position signal of the position sensor and a commanded position signal being greater than a difference threshold value while the feedback position signal and the commanded position signal are in a steady state condition and an electric actuator velocity being less than a velocity threshold value.

2. The method of claim 1, wherein the first end-stop position is a position at which the waste gate valve aligns with a valve seat to substantially stop a flow of exhaust gas.

3. The method of claim 1, wherein the second end-stop position is a fully open position of a waste gate.

4. The method of claim 1, wherein the second feedback position is associated with the second end-stop position responsive to the difference between the feedback position signal of the position sensor and the commanded position signal being greater than the difference threshold value while the feedback position signal and the commanded position signal are in the steady state condition and the electric actuator velocity being less than the velocity threshold value.

5. The method of claim 1, wherein associating the first feedback position with the first end-stop position includes determining a mean value of position sensor signal readings during a testing period where the waste gate valve is at the first end-stop position and associating the mean value with the first end-stop position.

6. The method of claim 1, wherein associating the second feedback position with the second end-stop position includes determining a mean value of position sensor signal readings during a testing period where the waste gate valve is at the second end-stop position and associating the mean value with the second end-stop position.

7. The method of claim 1, wherein the calibration of the waste gate position sensor is performed during a calibration operating condition.

8. The method of claim 7, wherein the calibration operating condition includes an engine idle condition.

9. The method of claim 7, wherein the calibration operating condition includes a deceleration fuel shut off condition.

10. A method for calibrating a waste gate position sensor comprising:
during a calibration operating condition,
controlling an electric actuator to adjust a waste gate valve to a first end-stop position;
associating a first feedback position signal of the waste gate position sensor with the first end-stop position;
controlling the electric actuator to adjust the waste gate valve to a second end-stop position;
associating a second feedback position signal of the waste gate position sensor with the second end-stop position; and
adjusting a position sensor gain based on the first feedback position signal and the second feedback position signal;
wherein associating the first feedback position signal includes determining a first mean value of position sensor signal readings during a testing period where the waste gate valve is at the first end-stop position and associating the first mean value with the first end-stop position, and associating the second feedback position signal includes determining a second mean value of position sensor signal readings during a testing period where the waste gate valve is at the second end-stop position and associating the second mean value with the second end-stop position.

11. The method of claim 10, wherein the calibration operating condition includes an engine operating condition in which a full stroke of the waste gate valve is commanded to control a turbocharger pressure.

12. The method of claim 10, wherein the calibration operating condition includes an engine idle condition.

13. The method of claim 10, wherein the calibration operating condition includes a deceleration fuel shut off condition.

14. The method of claim 10, wherein the first end-stop position is a fully closed position and the second end-stop position is a fully open position.

15. A method comprising:
controlling an electric actuator to adjust a waste gate valve to a first end-stop position; and
if a difference between a first feedback position signal and a first commanded position signal is greater than a difference threshold value while the first feedback position signal and the first commanded position signal are in a steady state condition and an electric actuator velocity is less than a velocity threshold value, associating the first feedback position signal with the first end-stop position.

16. The method of claim 15, wherein associating the first feedback position signal includes determining a mean value of position sensor signal readings during a testing period where the waste gate valve is at the first end-stop position and associating the mean value with the first end-stop position.

17. The method of claim 15, further comprising:
controlling the electric actuator to adjust the waste gate valve to a second end-stop position;
if a difference between a second feedback position signal and a second commanded position signal is greater than the difference threshold value while the second feedback position signal and the second commanded position signal are in the steady state condition and the electric actuator velocity is less than the velocity threshold value, associating the second feedback position signal with the second end-stop position; and
adjusting a position sensor gain based on the first feedback position signal and the second feedback position signal.

18. The method of claim 17, wherein associating the second feedback position signal includes determining a mean value of position sensor signal readings during a testing period where the waste gate valve is at the second end-stop position and associating the mean value with the second end-stop position.

* * * * *